United States Patent [19]
Soderlund et al.

[11] 3,767,338
[45] Oct. 23, 1973

[54] APPARATUS FOR PRODUCING OVERLAND EXTRUDATES

[75] Inventors: Clarence H. Soderlund, Battle Creek Township; David F. Hathaway, Battle Creek, both of Mich.

[73] Assignee: Kellogg Company, Battle Creek, Mich.

[22] Filed: Sept. 3, 1971

[21] Appl. No.: 177,663

[52] U.S. Cl. .................................. 425/131, 425/462
[51] Int. Cl. ............................. A23g 5/00, B29f 3/12
[58] Field of Search ................... 425/131, 462, 463, 425/376

[56] References Cited
UNITED STATES PATENTS

| | | | |
|---|---|---|---|
| 3,118,180 | 1/1964 | Nalle, Jr. .......................... | 425/463 X |
| 3,477,393 | 11/1969 | Bell et al .......................... | 425/131 X |
| 3,280,763 | 10/1966 | Komberer ......................... | 425/377 X |
| 3,413,684 | 12/1968 | Prandi et al. ..................... | 425/191 X |
| 3,461,197 | 8/1969 | Lemelson ......................... | 425/113 X |
| 3,227,103 | 1/1966 | Schafer ............................. | 425/463 |
| 2,779,970 | 2/1957 | Stocker ............................ | 425/462 X |
| 2,816,518 | 12/1957 | Daggett ............................ | 425/131 X |
| 1,709,280 | 4/1929 | Ost .................................... | 425/131 |

FOREIGN PATENTS OR APPLICATIONS

| | | | |
|---|---|---|---|
| 570,933 | 12/1957 | Italy .................................. | 425/131 |

Primary Examiner—J. Spencer Overholser
Assistant Examiner—David S. Safran
Attorney—Lee J. Gary et al.

[57] ABSTRACT

Process and apparatus for making a novel food product by extruding a plurality of separate plastic strands of food material through a stationary die to produce a composite stick-like product wherein the strands are in an overlaid helical or "twisted" configuration. The die includes separate individually converging straight bores that conjointly converge toward a common axis but are skewed or offset about said axis in the same direction so as to impart a helical configuration to the strand components of the composite extrudate. The strands may, for example, be of contrasting colors to impart a pleasant aesthetic affect to the final product.

8 Claims, 10 Drawing Figures

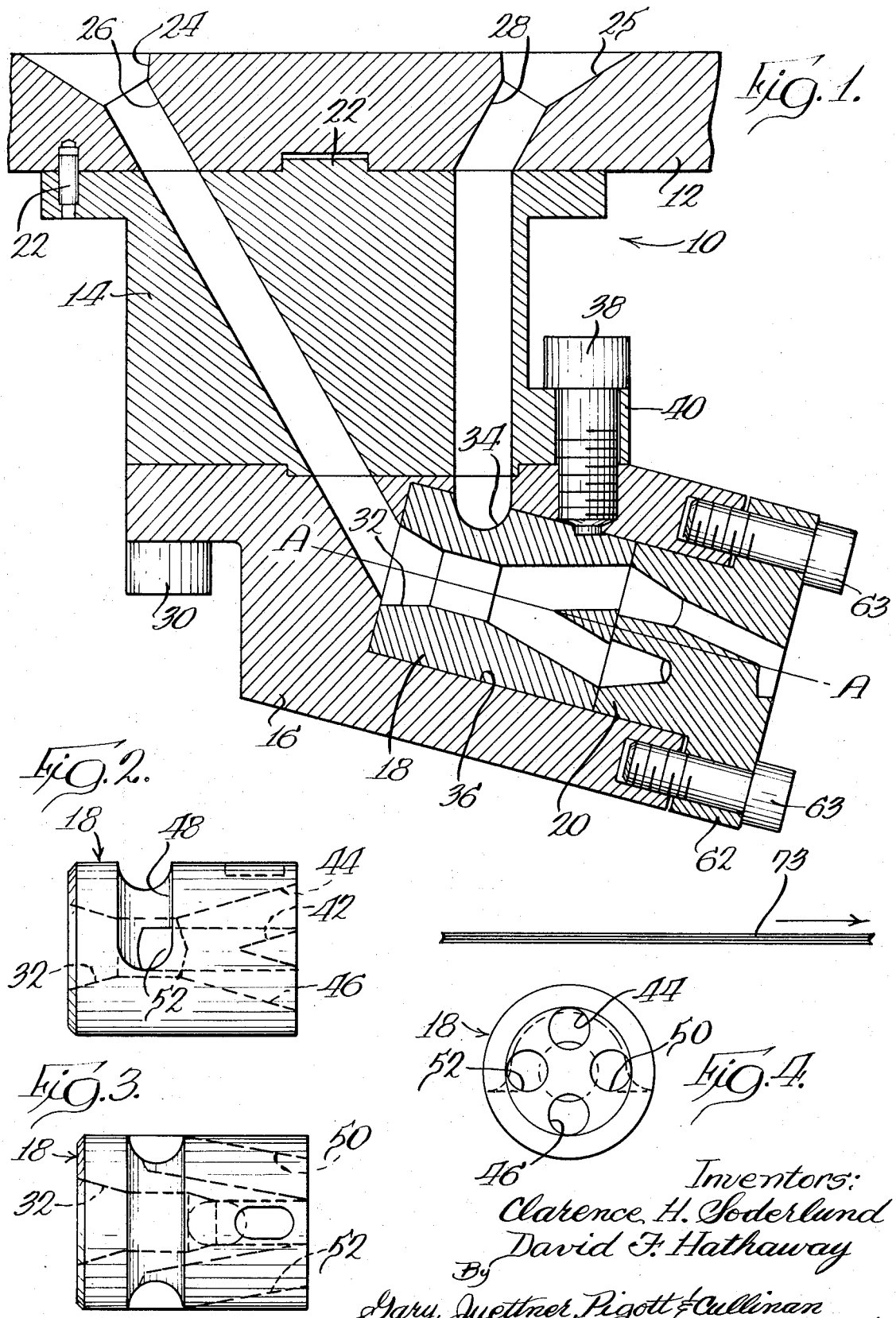

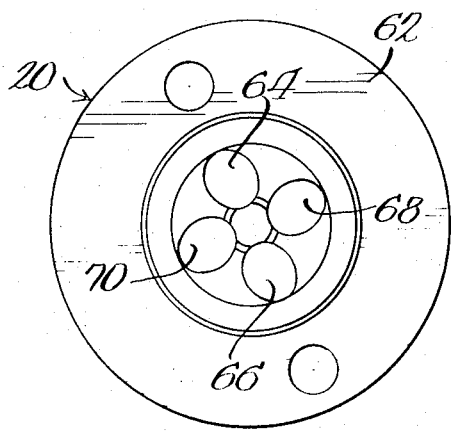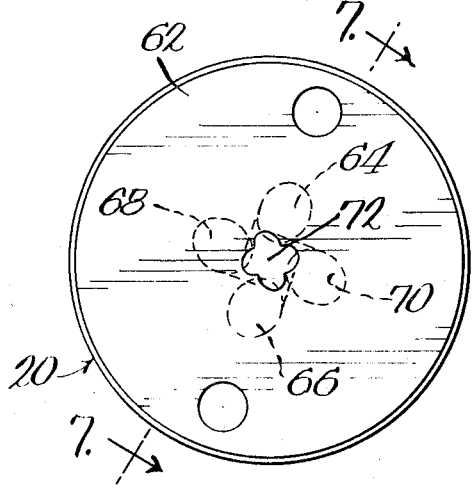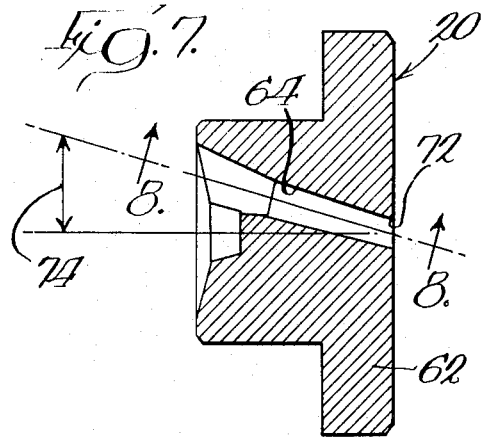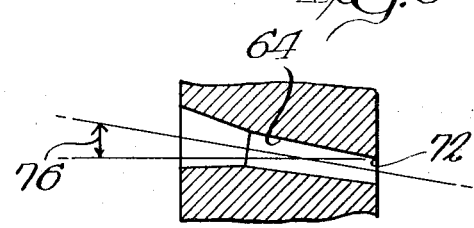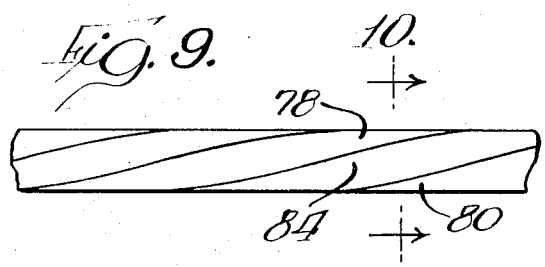

APPARATUS FOR PRODUCING OVERLAND EXTRUDATES

BACKGROUND OF THE INVENTION

This invention relates to process and apparatus for producing overlaid extrudates and more particularly to an apparatus and method for making a composite extruded food product of generally cylindrical configuration and having the appearance of a plurality of helically arranged or twisted stripes of alternating contrasting colors, flavors, textures and/or other characteristics.

The invention herein described is particularly adapted to be used in connection with formable food products and will be particularly described in terms of cereal, dough or pastry products, although it will be understood that the principles of the invention are equally adaptable to or useful in extruding other types of plastic or pliable materials.

In extruding dough materials, it is known to use an extruding die having one or more apertures therethrough in order to produce extrudates of various configurations, and also to form products of contrasting colors. Heretofore, the production of a helically striped cylindrical product resembling a barber pole has been accomplished by employing a motor driven die that rotates about the axis of the feed source. The pastry or dough is normally divided into two batches of contrasting colors. The two batchs are fed under pressure to alternate inlet openings in a rotating die and are extruded in the form of a cylindrical helically striped stick. The rotation of the die serves to impart the required twist to the extrudate as such is emitted from the die. Manifestly, it is important from an appearance viewpoint that the contrasting components remain as distinct stripes in the composite product and do not smear into one another.

Certain aspects of rotating die extrusion have been found to be undesirable in the preparation of products having contrasting colors. In some cases, the rotating die causes the adjacent streams to unduly overlap at their boundaries or smear over one another at the extrusion orifice. As a result, the stripe configuration is not clearly defined, which is aesthetically undesirable in a food product. Moreover, the proper sealing of the moving die with respect to the feed source and other problems incident to the use of moving parts relative to a stationary feed source render this form of extrusion impractical.

SUMMARY OF THE INVENTION

An object of this invention is the provision of an apparatus and method for producing extruded overlaid helical configurations, wherein the extrusion die is held in a fixed position and does not require moving parts or rotary seals or the like.

Another object of this invention is to provide an improved method for producing a generally cylindrical stick extrudate having discrete helical stripes of contrasting colors.

A further object is the provision of a method and apparatus for producing such striped products wherein the boundaries of adjacent stripes in the extrudate remain distinct and do not smear into one another.

Other objects will become apparent from the following description and appended claims, taken in connection with the accompanying drawings.

THE DRAWINGS

FIG. 1 is a fragmentary vertical section of apparatus employed in practice of the invention;

FIG. 2 is an elevational view of a stream splitter used in the apparatus illustrated in FIG. 1;

FIG. 3 is a plan view of the splitter shown in FIG. 2;

FIG. 4 is an outlet end view of the splitter shown in FIGS. 2 and 3;

FIG. 5 is an inlet end view of an extrusion die used in the apparatus of FIG. 1;

FIG. 6 is an outlet end view of said extrusion die;

FIG. 7 is a sectional view of the die taken substantially along line 7—7 of FIG. 6;

FIG. 8 is a fragmentary sectional view of the die taken substantially along line 8—8 of FIG. 7;

FIG. 9 is an elevational view of the extruded product made in accordance with the present invention;

FIG. 10 is a cross-sectional view of the product taken along line 10—10 of FIG. 9.

DESCRIPTION OF THE PREFERRED EMBODIMENT

Referring now in greater detail to the drawings, which illustrate a preferred embodiment of the apparatus of the invention, FIG. 1 shows that portion of the complete extrusion apparatus necessary for understanding the invention, the parts omitted being conventional as will be readily apparent to those skilled in the art. The apparatus generally comprises a header assembly, generally indicated at 10, comprising a top support plate 12 and a feed section 14 depending therefrom. A die holder 16 depends from the feed section 14 and contains a stream splitter 18 communicating between the feed section and a stationary die 20.

More specifically, the feed section 14 is secured to the underside of the top support plate 12 by bolts or the like, as is conventional, and is properly aligned with the support by guide pins and/or bosses 22. A pair of spaced, downwardly tapered openings 24 and 25 extend through the top plate 12 into respective cylindrical bores 26 and 28, which extend through the body of the feed section 14. It will be noted that one of the bores 28 is disposed substantially vertically within the feed section, whereas the other bore 26 is angularly disposed therein, the purpose of which is to properly orientate and align the bores with respect to the stream splitter 18 and its associated die 20.

Dough or other cereal material is fed under pressure into the tapered openings 24 and 25 by separate extruders or other pressure means in a conventional manner. The materials introduced under pressure into the separate bores are preferably of different colors and flavors, but otherwise substantially the same basic material. However, the two batches of material may be of different textures and/or have other differing characteristics, provided they have very similar responses to the particular extrusion conditions encountered in the apparatus of the invention. In the case of pastry doughs, the material employed preferably has sufficient plasticity or moisture content to assure smooth flow under pressure and to prevent clogging of the passages. The preferred moisture content of cereal products is in the order of about 16 to 30 percent, but more desirably about 18 to 22 percent. In order to assure equal flow of the different streams throughout the extrusion apparatus, the moisture contents of the two batches of material are preferably adjusted to within a 2 percent differential.

The die holder 16 is firmly secured to the feed section 14 by means of bolts 30 or the like, and the respective bores 26 and 28 extend into the body of the holder. Within the holder, the bores 26 and 28 extend into alignment and fluid engagement with respective tapered inlet openings 32 and 34 of the stream splitter 18, said splitter being generally cylindrical in external form and positioned within cylindrical open end recess 36 in the die holder 16. A bolt 38 extends through a flange 40 of the feed section 14 and also extends through the body of the die holder 16 into engagement with a notch in the stream splitter 16 in order to securely hold the same in position.

As shown in FIGS. 1-4, the stream splitter 18 serves to divide each of the separate streams into two substantially identical streams, with the result that four equally spaced streams are provided at the outlet of the splitter. The tapered inlet 32 corresponding to the angularly disposed bore 26 leads axially inward into a central chamber to encounter a V-shaped wall 42, the apex of the V facing upstream or toward the inlet. The chamber is flared outward on both sides of the V-wall into two separate bores 44 and 46 of the same diameter.

The other inlet 34 leading from the vertical bore 28 extends immediately to a semi-circular groove 48 in the body of the splitter, said groove extending semi-circumferentially around the outer perimeter of said splitter and around the other inlet equally on both sides thereof. The groove 48 and the interior surface of the die holder recess 36 together form a pair of passageways that communicate with respective open-end bores 50 and 52. It may be seen that the bores 50 and 52 are disposed perpendicular to the groove 48 and converge slightly toward the outlet end of the splitter to align with certain inlets in the die 16.

From the above, it may be seen that the splitter 18 divides the two main streams of different colors into four streams of alternating colors that travel in the same direction and are substantially parallel and equally spaced from one another, as best shown in FIG. 4. Moreover, the first pair of bores 44 and 46 are disposed in a common vertical plane, whereas the second pair of bores 50 and 52 are disposed in a common horizontal plane.

The outlets of the splitter communicate or are aligned with respective inlets that taper into respective bores 64, 66, 68 and 70 of the die 20. The die 20 is also generally cylindrical in form, and the inlet portion thereof is received in the cylindrical opening 36 of the die holder 16. A collar 62 extending around and integral with the die at the outlet side thereof enables securement of the die to the die holder by means of bolts 63 or the like passing through the collar and into threaded engagement with the holder. Since the bolts 63 are disposed axially of the die 20 and the stream splitter 18, said bolts also serve to maintain the die in firm abutment with the splitter. The die, of course, is held stationary with respect to other parts of the apparatus and is not rotated in any manner.

FIG. 1, 5, 6 and 7 illustrate the internal structure of the die 20. Four equally spaced inlets taper into respective straight bores 64, 66, 68 and 70, which extend through and exit at the outlet or extrusion side of the die. From FIGS. 1 and 7, it is seen that the aforesaid bores converge toward one another and appear to converge substantially toward a common axis when viewed in one dimension. From FIG. 8, however, it may be seen that the die bores are angularly disposed in a second dimension, i.e., with their respective planes of convergence such that true convergence is not achieved. The bores are each disposed on a substantially identical compound angle around a common axis in the same rotational direction such that the bores define straight but skewed passages that are progressively bunched toward and overlap in a common outlet 72. Stated differently, the outlets are rotated relative to the inlets, but straight, mutually converging bores interconnect the inlets and the outlets.

The compound angles of the die bores are best illustrated in FIG. 7 and 8 wherein the angle of convergence is indicated at 74 and the offset angle is indicated at 76. As an example of this invention, a die having a width of about 1 and three-eighths inches will produce optimum results by adjusting the angle of convergence 74 to about 15 degrees from normal and the offset angle 76 to about 8 degrees and 58 minutes. It should be understood, however, that various other angle combinations may be employed, depending on the width of the die, the extrusion pressure, the type of material that is extruded, and the desired result.

The bore configuration of the die, being skewed about a common axis, imparts a corresponding twist to the component streams of material traveling therein, thereby resulting in the desired helical configuration without the necessity for rotating the die. From FIG. 5, it may be seen that the bores of the die merge at the outlet 72 of the die to form a common central section with four discrete external boundaries of semi-circular shape, somewhat akin to an irregular or twisted epicycloid.

The extruded product of the invention is represented in FIGS. 9 and 10. When viewed in cross-section, as shown in FIG. 10, it may be seen that the extrudate is generally circular in form, and the four component laminations 78, 80, 82 and 84 have the appearance each of a solid quadrant. It may also be seen that pairs of colors are opposed and alternate with one another, and each laminate is firmly bonded to its adjacent laminate.

In operation, two separate batches of plastic or cereal material having the proper moisture content and of different flavors and/or colors are fed into the respective tapered openings 24 and 25 under pressure. The separate streams extend through the bores 26 and 28 into the stream splitter 18, whereupon they are split into opposed pairs of streams, with adjacent streams alternating in color. The streams from the splitter 18 then pass into corresponding inlet openings of the die 20 wherein the desired twist or helical configuration is imparted.

It will be noted that the bores or passages from the feed section 14 through the splitter 18 and die 20 become progressively smaller in diameter in order that the required pressure may be developed for extrusion, as is customary in the art. It will also be noted that the splitter 18 and the die 20 are disposed along a common downwardly slanted axis indicated as A—A, in order that the extrudate is emitted at a slight angle downward from horizontal. A conveyor 73 or other equivalent means is provided below the outlet of the die 20, said conveyor being operated to move in the same direction as the extrudate in order to move the extrudate away from the die.

By adjusting the speeds of the extruders feeding the inlets 24 and 25, or by modifying the diameters of the passages, the relative proportions of the opposed helical strands may be adjusted to give different ornamental effects. Obviously, the device may be modified by providing additional bores in the feed source and in the die in order to produce a stick of generally cylindrical form having more than four strands.

Although a preferred embodiment of the invention has been shown and described, it will be understood by those skilled in the art that changes may be made in the details thereof without departing from its scope as comprehended by the following claims.

Having thus described the invention, what is claimed is:

1. In apparatus for producing overlaid extrudates from a plurality of streams of pliable material emitted from a feed source, a die having a plurality of bores therethrough between an entrance side and an exit side thereof, said bores converging toward a common axis in one dimension from said entrance to said exit and angularly offset in the same direction relative to said axis in another dimension such as to present a progressively bunched and skewed configuration from said entrance to said exit, and feed means for feeding streams from said feed source under pressure to said bores at the entrance side of said die.

2. The apparatus of claim 1 wherein said die is held stationary.

3. The apparatus of claim 1 wherein said bores are spaced from one another at the entrance side of said die and merge with one another at the exit side of the die at a common opening, said opening resembling an epicycloid.

4. The apparatus according to claim 1 wherein said bores are individually straight from the entrance to the exit side of said die.

5. Apparatus for producing substantially cylindrical sticks of extrudate having two contrasting colors laid up in an alternating helical pattern, comprising feed means for feeding two separate streams of material under pressure, splitter means for splitting each of said streams into pairs of separate streams with the streams of the respective colors alternating with one another, and stationary die means for receiving the separate streams, converging the streams onto one another into a common extrudate and at the same time turning said streams in a common direction about a common axis to impart a helical configuration to the constituent streams of the common extrudate discharged from said die means.

6. Apparatus according to claim 5 wherein said splitter means and said die means are in substantial axial alignment along the axis of the extrudate, said axis being inclined downward whereby removal of the extrudate is assisted by gravity.

7. The apparatus of claim 5 wherein said splitter means comprises a body having a pair of inlets each communicating with a respective one of said stream feed means, one of said inlets diverging into two separate passages in a vertical plane, the other of said inlets diverging around said one inlet into two separate passages in a horizontal plane, the passages from said one inlet alternating with the passages from said other inlet.

8. The apparatus of claim 5 including a substantially horizontal conveyor beneath said die means moving in the direction of extrusion for carrying extrudate away from said die means.

* * * * *